Aug. 7, 1928.

W. KABISIUS

DEPTH GAUGE

Filed May 26, 1923

1,679,473

Inventor:
Walter Kabisius

Patented Aug. 7, 1928.

1,679,473

UNITED STATES PATENT OFFICE.

WALTER KABISIUS, OF JENA, GERMANY, ASSIGNOR TO THE FIRM OF CARL ZEISS, OF JENA, GERMANY.

DEPTH GAUGE.

Application filed May 26, 1923, Serial No. 641,647, and in Germany December 14, 1920.

The present invention relates to depth gauges in which the stop surface may be adjusted with respect to the direction of displacement of the measure in different oblique positions. Such gauges serve, e. g. for measuring with bores oblique to a plane surface of a work-piece the perpendicular distance from the contact point of the gauge to the stop surface. According to the invention for each oblique position of the measure provided a special scale is fixed thereon, so that the said perpendicular distance can always be directly read off. In order that with such a construction of the depth gauge the correct scale can always be read off, it is advisable to surround the part which serves for guiding the measure and on which the reading marks are also fitted, with a casing and to provide thereon window-like openings which are so disposed that in each position of use of the measure there is only visible from outside the proper scale to be used with the corresponding vernier while the remaining scales are concealed. Moreover, it is possible to carry out the depth measure in such a way as to be able to also adjust the measure, besides different oblique positions, perpendicularly to the stop surface, so that the depth gauge can also be used in the ordinary manner.

Figure 1:
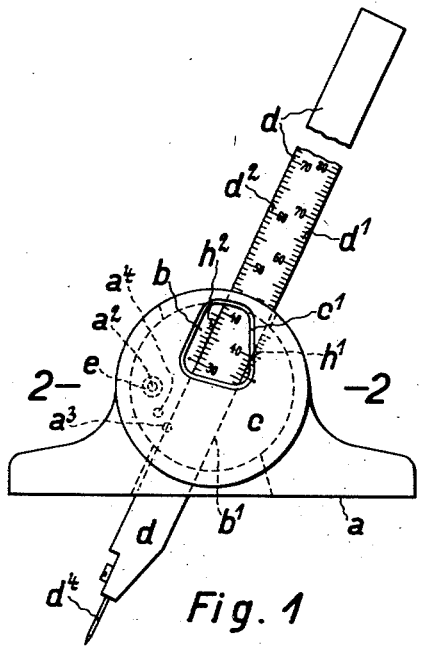
Figure 2:
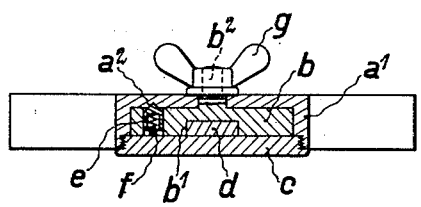
Figure 3:
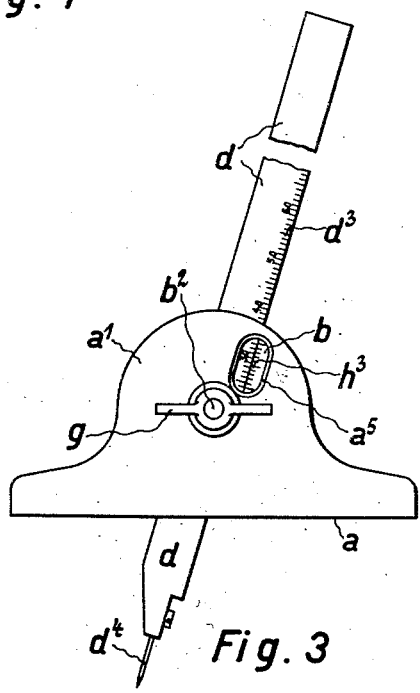

The accompanying drawing shows a depth gauge according to the invention in which the measure can be adjusted to two different oblique positions and, in addition, perpendicularly to the stop surface. Fig. 1 is a front view of the depth gauge in the more oblique position of the measure, Fig. 2 is a cross section on the line 2—2 of Fig. 1; Fig. 3 shows the back of the depth gauge, whereby the measure is adjusted to the second, somewhat less oblique position.

A ruler $a$ is formed at the top as a flat, cylindrical casing $a^1$, having a cylindrical opening in one face to rotatably receive the disc $b$ and being outwardly closed by means of a lid $c$, having its rim threaded to engage with threads in the opening and having a flange to engage the edge of the opening, thereby forming a cover to close the opening. The disc $b$ is provided on one side with a groove $b^1$ extending in the direction of a diameter in which groove may slide a ruler $d$ forming the measure, corresponding openings being also provided in the casing $a^1$ for the passage of the ruler $d$. In a bore close to the margin of the disc $b$ there is a pointed pin $e$ which is continuously pressed towards one side by means of a spring $f$. The point of the pin $e$ enters an indentation $a^2$ on the inner bottom part of the casing $a^1$ and holds the disc $b$ by the pressure of the spring $f$ in its position. Besides the indentation $a^2$ provision is made for two additional, like indentations, viz one $a^3$ for a somewhat less oblique position of the measure $d$ and one $a^4$ for the position of the measure perpendicular to the ruler $a$. The disc $b$ penetrates with its centre by means of a pivot $b^2$ the bottom of the casing $a^1$, so that the disc $b$ can also be clamped by means of a wing nut $g$. On the measure $d$ are disposed for its three positions of use three scales $d^1$, $d^2$ and $d^3$, viz two, $d^1$ and $d^2$, on the front and one, $d^3$, on the back, each of which scales is adapted to indicate the perpendicular distance from the point of the measure to the stop surface at only one certain inclination of scale $d$, the respective inclinations corresponding to the different scales being different. For the reading of the scales provision is made both in the lid $c$ and the bottom of the casing $a^1$ for an opening each $c^1$ and $a^5$ respectively, which are so disposed that in each of the three positions of use there is only visible the scale available therefor together with a corresponding vernier $h^1$, $h^2$ and $h^3$ respectively, fitted on the disc $b$. The point of the measure $d$ is formed by a steel point $d^4$ inserted therein. With that inclination, which is shown in Fig. 1, there are only visible the scale $d^2$ and the vernier $h^2$; with that inclination, which is shown in Fig. 3, there are only visible the scale $d^3$ and the vernier $h^3$, and if the ruler $d$ be in a vertical position there are only visible the scale $d^1$ and the vernier $h^1$.

I claim:

1. In a depth gauge, a body having a side constituting a stop surface, a cylindrical guide carried by said body rotatable on an axis parallel to the plane of said side and perpendicular to the longitudinal axis thereof, there being a slot in said guide perpendicular to the pivotal axis thereof, a measure slidably fitting said slot, there being a plurality of scales on said measure, and cooperating indices on said guide, each scale corresponding to a certain definite angular position of said guide and scale relative to said stop surface, whereby the perpendicular distance from the end of said measure to the stop surface may be read off.

2. In a depth gauge, a body having a side constituting a stop surface, a cylindrical guide carried by said body rotatable on an axis parallel to the plane of said side and perpendicular to the longitudinal axis thereof, there being a slot in said guide perpendicular to the pivotal axis thereof, a measure slidably fitting said slot, there being a plurality of scales on said measure, and cooperating indices on said guide, each scale corresponding to a certain definite angular position of said guide and scale relative to said stop surface, whereby the perpendicular distance from the end of said measure to the stop surface may be read off, there being openings provided on said body in an invariable position, adapted to render visible only that scale which appertains to that angular position according to which said guide is adjusted.

WALTER KABISIUS.